United States Patent [19]

Schaeffer

[11] Patent Number: 5,257,398
[45] Date of Patent: Oct. 26, 1993

[54] HOPPED-CARRIER DYNAMIC FREQUENCY REUSE

[75] Inventor: Dennis R. Schaeffer, Buffalo Grove, Ill.

[73] Assignee: Motorola, Inc., Schaumburg, Ill.

[21] Appl. No.: 485,718

[22] Filed: Feb. 27, 1990

[51] Int. Cl.$^5$ .............................................. H04Q 7/00
[52] U.S. Cl. ...................................... 455/33.1; 379/63
[58] Field of Search ............... 455/33, 34, 54; 379/60, 379/63

[56] References Cited

U.S. PATENT DOCUMENTS

| | | | |
|---|---|---|---|
| 4,144,496 | 3/1979 | Cunningham | 325/53 |
| 4,479,226 | 10/1984 | Prabhu et al. | 455/33 |
| 4,578,815 | 3/1986 | Persinotti | 455/15 |
| 4,669,107 | 5/1987 | Eriksson-Lennartsson | 379/60 |
| 4,866,710 | 9/1989 | Schaeffer | 455/33 |

OTHER PUBLICATIONS

V. H. MacDonald, "AMPS: The Cellular Concept," The Bell Technical Journal vol. 58, No. 1, Jan. 1979, pp. 15–41.

*Primary Examiner*—Reinhard J. Eisenzopf
*Assistant Examiner*—Christine K. Belzer
*Attorney, Agent, or Firm*—Raymond J. Warren; F. John Motsinger

[57] ABSTRACT

In a cellular radiotelephone network, there is provided a mechanism for dynamic frequency reuse. It comprises: allocating according to one reuse pattern during one time interval at least one of a plurality of hopped carriers and allocating according to another reuse pattern during another, substantially non-overlapping time interval that hopped carrier, all in substantially non-interfering time synchronism with any proximal reuse of that carrier. The attendant advantage is the realization of a dynamically allocatable frequency reuse, using shared carriers and frequency hopping to provide the desired C/I performance.

21 Claims, 3 Drawing Sheets

TWO SITE CARRIER ASSIGNMENT

|        | A  | B  | C  | D  | E  | F  | G  | H  | I  | J  | K  | L  |
|--------|----|----|----|----|----|----|----|----|----|----|----|----|
| BCCH   | 1  | 2  | 3  | 4  | 21 | 22 | 23 | 24 | 42 | 43 | 44 | 45 |
| TCH    | 5  | 6  | 7  | 8  | 25 | 26 | 27 | 28 | 46 | 47 | 48 | 49 |
| TCH    | 9  | 10 | 11 | 12 | 29 | 30 | 31 | 32 | 50 | 51 | 52 | 53 |
| TCH    | 13 | 14 | 15 | 16 | 33 | 34 | 35 | 36 | 54 | 55 | 56 | 57 |
| TCH    | 17 | 18 | 19 | 20 | 37 | 38 | 39 | 40 | 58 | 59 | 60 | 61 |
| T/BCCH |    |    |    |    | 41 |    |    |    | 62 |    |    |    |

TWO/ONE SITE CARRIER ASSIGNMENT

|        | A  | B  | C  | D  | E  | F  | G  | H  | I  | J  | K  | L  |
|--------|----|----|----|----|----|----|----|----|----|----|----|----|
| BCCH   | 1  | 2  | 3  | 4  | 21 | 22 | 23 | 24 | 42 | 43 | 44 | 45 |
| TCH    | 5  | 6  | 5  | 6  | 25 | 26 | 25 | 26 | 46 | 47 | 46 | 47 |
| TCH    | 7  | 8  | 7  | 8  | 27 | 28 | 27 | 28 | 48 | 49 | 48 | 49 |
| TCH    | 9  | 10 | 9  | 10 | 29 | 30 | 29 | 30 | 50 | 51 | 50 | 51 |
| TCH    | 11 | 12 | 11 | 12 | 31 | 32 | 31 | 32 | 52 | 53 | 52 | 53 |
| TCH    | 13 | 14 | 13 | 14 | 33 | 34 | 33 | 34 | 54 | 55 | 54 | 55 |
| TCH    | 15 | 16 | 15 | 16 | 35 | 36 | 35 | 36 | 56 | 57 | 56 | 57 |
| TCH    | 17 | 18 | 17 | 18 | 37 | 38 | 37 | 38 | 58 | 59 | 58 | 59 |
| TCH    | 19 | 20 | 19 | 20 | 39 | 40 | 39 | 40 | 60 | 61 | 60 | 61 |
| T/BCCH |    |    |    |    | 41 |    | 41 |    | 62 |    | 62 |    |

| Sector-Cell A | | | | | | | | | Sector-Cell C | | | | | | | | |
|---|---|---|---|---|---|---|---|---|---|---|---|---|---|---|---|---|---|
| A0 | A1 | A2 | A3 | A4 | A5 | A6 | A7 | A8 | C0 | C1 | C2 | C3 | C4 | C5 | C6 | C7 | C8 |
| 1 | 5 | 7 | 9 | 11 | 13 | 15 | 17 | 19 | 3 | 5 | 7 | 9 | 11 | 13 | 15 | 17 | 19 |
| 5 | 7 | 9 | 11 | 13 | 15 | 17 | 19 | 1 | 5 | 7 | 9 | 11 | 13 | 15 | 17 | 19 | 3 |
| 7 | 9 | 11 | 13 | 15 | 17 | 19 | 1 | 5 | 7 | 9 | 11 | 13 | 15 | 17 | 19 | 3 | 5 |
| 9 | 11 | 13 | 15 | 17 | 19 | 1 | 5 | 7 | 9 | 11 | 13 | 15 | 17 | 19 | 3 | 5 | 7 |
| 11 | 13 | 15 | 17 | 19 | 1 | 5 | 7 | 9 | 11 | 13 | 15 | 17 | 19 | 3 | 5 | 7 | 9 |
| 13 | 15 | 17 | 19 | 1 | 5 | 7 | 9 | 11 | 13 | 15 | 17 | 19 | 3 | 5 | 7 | 9 | 11 |
| 15 | 17 | 19 | 1 | 5 | 7 | 9 | 11 | 13 | 15 | 17 | 19 | 3 | 5 | 7 | 9 | 11 | 13 |
| 17 | 19 | 1 | 5 | 7 | 9 | 11 | 13 | 15 | 17 | 19 | 3 | 5 | 7 | 9 | 11 | 13 | 15 |
| 19 | 1 | 5 | 7 | 9 | 11 | 13 | 15 | 17 | 19 | 3 | 5 | 7 | 9 | 11 | 13 | 15 | 17 |

Figure 4

Hopping Sequence Assignment Scheme

| Reuse Pattern | Sector-Cells | | | |
|---|---|---|---|---|
| | $b_A$ | $c_A$ | $a_C$ | $d_C$ |
| 4 Site | A0<br>A4<br>A8 | A1<br>A5 | C2<br>C6 | C3<br>C7 |
| 2 Site | A5<br>A1 | A8<br>A4<br>A0 | C7<br>C3 | C6<br>C2 |
| 1 Site | A7<br>A6<br>A3<br>A2 | A7<br>A6<br>A3<br>A2 | C8<br>C5<br>C4<br>C1<br>C0 | C8<br>C5<br>C4<br>C1<br>C0 |

Figure 5

HOPPED-CARRIER DYNAMIC FREQUENCY REUSE

THE FIELD OF INVENTION

This invention is concerned with frequency reuse.

More particularly, this invention is concerned with dynamic frequency reuse using shared-carrier frequency hopping in a cellular radiotelephone network.

BACKGROUND OF THE INVENTION

U.S. Pat. No. 4,144,411 to Frenkiel teaches static reuse of frequencies in a large-cell reuse pattern to an underlaid, smaller reuse pattern. The smaller reuse pattern is achieved through yet lower transmit powers (or perhaps different SNR or C/I criterion) than in the larger cell.

In planning cellular radiotelephone systems, there is a never ending tension between Carrier-to-Interference (C/I) immunity and highest capacity, all drawn from the very same scarce radio spectrum. Higher frequency reuse directly improves capacity, but adversely affects C/I performance. Frequency hopping improves C/I performance, but requires more allocated frequencies over which to hop. Yet, both interference (C/I) and capacity (frequency reuse) are dynamic, traffic-induced, demographic, and time-of-day phenomena. These dynamic phenomena are not well suited to traditional, statically-planned strategies.

This invention takes as its object to overcome these shortcomings and to realize certain advantages presented below.

SUMMARY OF THE INVENTION

In a cellular radiotelephone network, there is provided a mechanism for dynamic frequency reuse. It comprises: allocating according to one reuse pattern during one time interval at least one of a plurality of hopped carriers and allocating according to another reuse pattern during another, substantially non-overlapping time interval that hopped carrier, all in substantially non-interfering time synchronism with any proximal reuse of that carrier. The attendant advantage is the realization of a dynamically allocatable frequency reuse, using shared carriers and frequency hopping to provide the desired C/I performance.

DESCRIPTION OF THE DRAWINGS

Additional objects, features and advantages of the invention will be more clearly understood and the best mode contemplated for practicing it in its preferred embodiment will be appreciated (by way of unrestricted example) from the following detailed description, taken together with the accompanying drawings in which:

FIG. 4 illustrates a shared-carrier, frequency-hopping allocation according to the preferred embodiment of the invention.

FIG. 5 illustrates a frequency-hopping allocation scheme according to the preferred embodiment of the invention.

DETAILED DESCRIPTION

Figures 1, 2, 3:
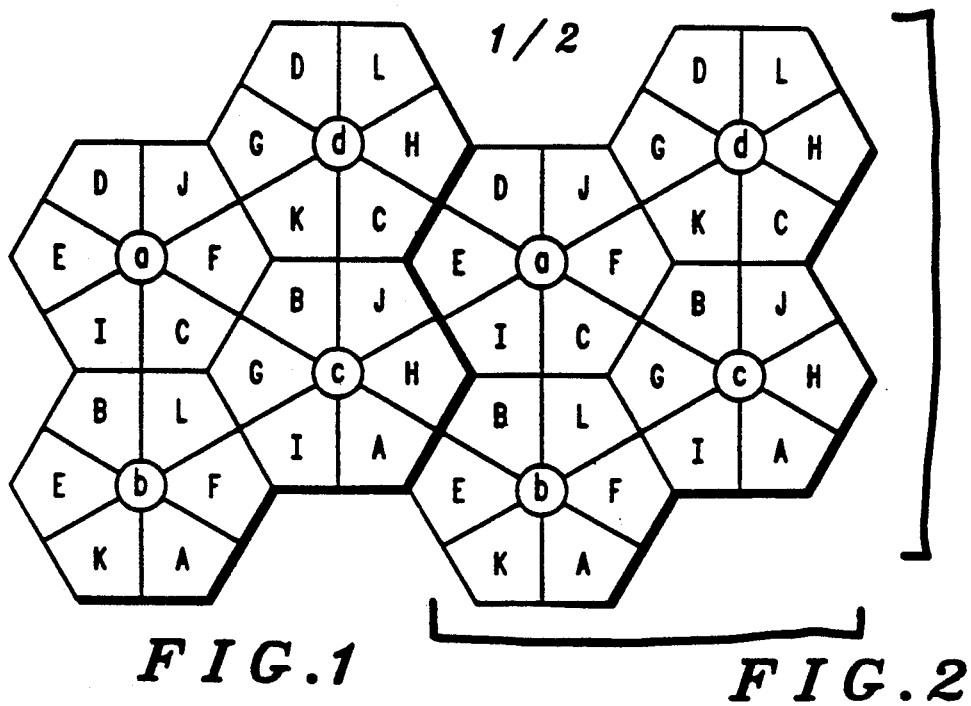
FIG. 1 illustrates a four-site (a-d), 60 degree sectored antenna (A-L), cellular radiotelephone reuse pattern according the instant invention.
FIG. 2 illustrates how, according to the preferred embodiment of the invention, frequencies are allocated to the reuse pattern of FIG. 1.
FIG. 3 illustrates the reuse frequency allocation according to the preferred embodiment of the invention.

FIG. 1 illustrates a four-site (a-d), 60 degree sectored antenna (A-L), cellular radiotelephone reuse pattern according the instant invention. In effect, this particular four site pattern (a-d) exhibits two-cell reuse in that each frequency set (A-L) is reused twice within the four-cell pattern (a-d), although no cell (a, b, c, or d) is repeated within the pattern itself.

FIG. 2 illustrates how, according to the preferred embodiment of the invention, frequencies are allocated to the reuse pattern of FIG. 1. In the presently-proposed GSM/Pan-European Digital Cellular (GSM/PEDC) radiotelephone system, a 12.5 MHz-wide frequency spectrum of sixty-two, 200 KHz-wide carriers (one-half of the 25 MHz-wide spectrum for one of two operators) would be (nearly) equally distributed within twelve frequency sets (A-L) over twelve sector-cells (A-L); that is: four sectors per site times four sites (a-d) divided by a two-cell reuse pattern.

FIG. 3 illustrates a one cell reuse (if all table offsets were assigned in all cells) frequency allocation according to the preferred embodiment of the invention. GSM/PEDC reserves one Base Control CHannel (BCCH) carrier per sector-cell (1-4, 21-24, and 42-45) for access and system control. That allocation remains unchanged in this allocation. However, if the remaining Traffic CHannel (TCH) carriers were pooled (say carriers 5, 9, 13, and 17 from A and 7, 11, 15, and 19 from C) into six shared TCH carrier sets (A/C, B/D, E/G, F/H, I/K and J/L), an effective one cell (or once per site) reuse efficiency would be obtained. Where a mobile subscriber in a coverage area (say A) is experiencing undue interference from a co-channel reuse of that frequency (say C), that subscriber could be reassigned to the BCCH, which is on a larger, two-cell reuse pattern ($b_A$, $c_A$) and will experience less (less than one-half the) interference. The sector-cell TCH capacity is thereby increased from four TCHs per sector (e.g., carriers 5, 9, 13, and 17) to eight per sector (e.g., carriers 5, 7, 9, 11, 13, 15, 17), with odd/even adjacent carrier separation. Since carriers 20 (sector D) and 21 (sector E) would cause adjacent carrier interference at site a, carrier 41 is used as the BCCH instead of 21.

A further reduction in interference can be obtained through frequency hopping. FIG. 4 illustrates a one cell reuse, shared-carrier, frequency-hopping allocation according to the preferred embodiment of the invention. It illustrates the nine unique ascending sequences (0-8) over which all nine (one BCCH+8 TCHs) carriers are cycled in time synchronism with one another and in time synchronism between sites (a-d), and their reuses. Frequency hopping in the base equipment and in the mobile subscriber equipment could be implemented as a pointer into a circular queue of frequencies. Such circular queue means for time-synchronously allocating carriers in the fashion described is well within the capability of one ordinarily skilled with cellular base station control methodologies employed a base station controller or in a mobile subscriber unit.

At full capacity, Sector-Cell A and Sector-Cell C would be cycling over the same 8 TCHs on a one-cell reuse pattern (note that only the embedded BCCH differs between sector-cells A and C, for example). But when the system is operating at less than full capacity, interference can be reduced by reverting to a two-cell pattern by allocating say four (0-3) of the nine hopping sequences (0-8) to one sector-cell (say $b_A$) and the other five (4-8) of the nine to the other sector-cell (either $c_A$, $a_C$, or $d_C$, or any other combination of A and C).

FIG. 5 illustrates a scheme for allocating each of the nine hopping sequences (0-8) for the highest reuse for a given traffic load. The nine hopping sequences (0-8) would initially be (evenly) distributed between sector-cells A and C on a four-site reuse pattern ($b_A$, $c_A$, $a_C$, and $d_C$). What makes this allocation a four-site reuse pattern is that none of the nine (0-8) hopping sequences are reused in any other sector-cell. This allocation, by itself, would provide the best C/I performance (albeit, the lowest capacity).

As the traffic load increases, some of the hopping sequences (0-8) would be reused, resulting in a two-site reuse pattern for those reused sequences, while those that are not yet reused would still be operating on the wider, four-site reuse pattern. When all of the hopping sequences have been used twice, as in adding the center of the table in FIG. 5 to the top portion (sites b and c, for example, would be operating on a two-site reuse pattern because all of the hopping sequences in bA are also being used in cA; similarly, aC and dC).

As the traffic load increases yet again, some of the hopping sequences (2, 3, 6 and 7) used heretofore exclusively in sector-cell C (C2, C3, C6, and C7) must be reused in sector-cell A (A2, A3, A6, and A7), and visa versa. Those sequences that are reused, when added to those already in use, would be operating on a one-site reuse pattern, with the highest capacity (albeit, the lowest C/I performance) until, finally, all nine sequences (0-8) are being used at all four sites.

As the traffic load subsides, hopping sequences would be deallocated in reverse order. Accordingly, the system would migrate from a one-site reuse pattern to a two-site reuse pattern and finally revert to a four-site reuse pattern. There would be a corresponding loss of channel capacity, but an increase in C/I performance. The C/I performance for all mobile subscribers is then optimized to the extent that traffic loading permits. The mechanism for accomplishing this has been the allocation of hopping sequences—the assignment of a pointer position in an ascending or descending circular queue.

Note that in FIG. 5, according to another aspect of the invention, the allocation of hopping sequences for a four-site reuse pattern is in ascending order (e.g., A0, A4, A8), while the hopping sequences for two-site and one-site operation are in descending order (e.g., A8, A4, A0). This will postpone for as long as possible certain conflicting allocations (higher reuses). For example, if A8 in the four-site reuse pattern is vacated before all two-site allocations are vacated, there could be a lessened amount of conflict because $b_A$:A8 is the last four-site to be allocated; the ascending/descending feature accommodates these dynamics.

This scheme could be applied to a slotted, Time-Division Multiple Access system like the proposed GSM/Pan-European Digital Cellular (GSM/PEDC) system. That system uses eight timeslots in a repeating frame. If the four-site, ascending sequences were allocated in ascending timeslot order (0-7), while the two-site and one-site sequences were allocated in descending timeslot order (7-0), no conflict (no higher reuse) would occur even though mobile subscribers in the same sector-cell share the very same hopping sequence until the same hopping sequence (0-9) is used in the same timeslot (0-7) in two or more sector-cells (e.g., $b_A$, $c_A$, $a_C$ and $d_C$).

Accordingly, altering the reuse pattern becomes a matter of dynamically allocating the offset pointer into the hopping queue of the base site equipment and the mobile subscriber equipment.

Thus, in a cellular radiotelephone network, there has been provided a mechanism for dynamic frequency reuse. It comprises: allocating according to one reuse pattern during one time interval at least one of a plurality of hopped carriers and allocating according to another reuse pattern during another, substantially non-overlapping time interval that hopped carrier, all in substantially non-interfering time synchronism with any proximal reuse of that carrier. The attendant advantage of this invention is the realization of a dynamically allocatable frequency reuse, using shared carriers and frequency hopping to provide the desired C/I performance.

While the preferred embodiment of the invention has been described and shown, it will be appreciated by those skilled in this field that other variations and modifications of this invention may be implemented. For example, although the foregoing discussion has alluded to GSM/PEDC (which is a Time-Division Multiple Access system), this invention is equally applicable to non-TDM systems, provided all frequency hopping is coordinated in time so as to be non-interfering (in time); naturally, the inherent synchronization provided in TDM systems makes this invention more readily implementable.

These and all other variations and adaptions are expected to fall within the ambit of the appended claims.

What we claim and desire to secure by Letters Patent is:

1. A method of dynamic frequency reuse comprising:
allocating according to one reuse pattern during one time interval at least one of a plurality of carriers and allocating according to another reuse pattern during another, substantially non-overlapping time interval that carrier, all in substantially non-interfering time synchronism with any proximal reuse of that carrier.

2. A method of dynamic frequency reuse comprising:
allocating according to one reuse pattern during one time interval at least one of a plurality of hopped carriers and allocating according to another reuse pattern during another, substantially non-overlapping time interval that hopped carrier, all in substantially non-interfering time synchronism with any proximal reuse of that carrier.

3. A method as claimed in claim 2 above, wherein at least one hopping sequence is allocated to one reuse pattern whereas another hopping sequence is allocated to another reuse pattern.

4. A method as claimed in claim 2 above, wherein certain of a plurality of hopping sequences are allocated to one reuse pattern whereas certain others of that plurality are allocated to another reuse pattern.

5. A method as claimed in claim 2 above, wherein certain of a plurality of hopping sequences are allocated to one reuse pattern whereas certain others of that plurality, disjoint in time, are allocated to another reuse pattern.

6. A method of dynamic frequency reuse in a communication system having a plurality of cells, said method comprising:

allocating, according to a first reuse pattern during one time interval, a first carrier of a plurality of carriers to a first cell of said plurality of cells and a second carrier of said plurality of carriers to a second cell of said plurality of cells; and adding said second carrier to said first cell and said first carrier to said second cell to form a second reuse pattern;

wherein said first carrier is utilized in said first and second cells in substantially non-interfering first and second time sequences, respectively.

7. The method of claim 6 wherein said first and second time sequences are first and second hopping sequences, respectively.

8. The method of claim 6 further comprising the step of removing said second carrier from said first cell and said first carrier from said second cell and returning to said first reuse pattern.

9. A method of dynamic frequency reuse in a communication system having a plurality of cells each having a plurality of sectors, said method comprising:

allocating, according to a first reuse pattern during one time interval, a first carrier of a plurality of carriers to a first sector of a first cell of said plurality of cells and a second carrier of said plurality of carriers to a first sector of a second cell of said plurality of cells; and adding said second carrier to said first sector of said first cell and said first carrier to said first sector of said second cell to form a second reuse pattern;

wherein said first carrier is utilized in said first and second cells in substantially non-interfering first and second time sequences, respectively.

10. The method of claim 9 wherein said first and second time sequences are first and second hopping sequences, respectively.

11. The method of claim 9 further comprising the step of removing said second carrier from said first cell and said first carrier from said second cell and returning to said first reuse pattern.

12. The method of claim 9 wherein said step of allocating further comprises allocating a third carrier of said plurality of carriers to said first sector of said first cell and a fourth carrier of said plurality of carriers to said first sector of said second cell of said plurality of cells wherein if a subscriber having access to said second carrier of said first sector of said first cell is experiencing a level of interference in excess of a predetermined interference level, then said subscriber is transferred from said second carrier to said third carrier of said first sector of said first cell.

13. A method of dynamic frequency reuse in a communication system having a plurality of cells with each cell having a plurality of sectors, said method comprising:

allocating a first hopping sequence to a first sector of a first cell, and a second hopping sequence to a first sector of a second cell, a third hopping sequence to a first sector of a third cell, and a fourth hopping sequence to a first sector of a fourth cell;

adding, in response to an increase in a traffic load, said second hopping sequence to said first sector of said first cell, said first hopping sequence to said first sector of said second cell, said fourth hopping sequence to said first sector of said third cell, and said third hopping sequence to said first sector of said fourth cell; and adding, in response to a further increase in said traffic load, said third and fourth hopping sequences to said first sectors of said first and second cells, and said first and second hopping sequences to said first sectors of said third and fourth cells.

14. The method of claim 13 further comprising the steps of:

removing, in response to a decrease in said traffic load, said third and fourth hopping sequences from said first sectors of said first and second cells and said first and second hopping sequences from said first sectors of said third and fourth cells; and removing, in response to a further decreasing said traffic load, said second hopping sequence from said first sector of said first cell, said first hopping sequence from said first sector of said second cell, said fourth hopping sequence from said first sector of said third cell, and said third hopping sequence form said first sector of said fourth cell.

15. A method of dynamic frequency reuse in a communication system having a plurality of cells with each cell having a plurality of sectors, said method comprising:

allocating a first channel to a first sector of a first cell, and a second channel to a first sector of a second cell, a third channel to a first sector of a third cell, and a fourth channel to a first sector of a fourth cell;

adding, in response to an increase in a traffic load, said second channel to said first sector of said first cell, said first channel to said first sector of said second cell, said fourth channel to said first sector of said third cell, and said third channel to said first sector of said fourth cell; and adding, in response to a further increase in said traffic load, said third and fourth channels to said first sectors of said first and second cells, and said first and second channels to said first sectors of said third and fourth cells.

16. The method of claim 15 further comprising the steps of:

removing, in response to a decrease in said traffic load, said third and fourth channels from said first sectors of said first and second cells and said first and second channels from said first sectors of said third and fourth cells; and removing, in response to a further decreasing said traffic load, said second channel from said first sector of said first cell, said first channel from said first sector of said second cell, said fourth channel from said first sector of said third cell, and said third channel form said first sector of said fourth cell.

17. The method of claim 16 wherein each of said channels is a traffic channel.

18. A communication system having a plurality of cells, each cell having a plurality of sectors, said communication system having:

a first frequency reuse pattern assigned to a first sector of each of a first cell and a second cell of said plurality of cells; and a second frequency reuse pattern assigned to a second sector of each of said first and second cells.

19. The communication system of claim 18 wherein said first frequency reuse pattern is a four site reuse pattern and said second frequency reuse pattern is a two site reuse pattern.

20. The communication system of claim 18 further comprising a third frequency reuse pattern assigned to a third sector of each of said first and second cells.

21. The communication system of claim 20 wherein said first frequency reuse pattern is a four site reuse pattern, said second frequency reuse pattern is a two site reuse pattern, and said third frequency reuse pattern is a one site reuse pattern.

* * * * *